United States Patent
Patel et al.

(10) Patent No.: US 10,208,850 B1
(45) Date of Patent: Feb. 19, 2019

(54) TRANSMISSION CASE WITH INTEGRATED DRAIN CHANNEL

(71) Applicant: FORD GLOBAL TECHNOLOGIES, LLC, Dearborn, MI (US)

(72) Inventors: Romi Patel, Canton, MI (US); Michael Wielosinski, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/893,960

(22) Filed: Feb. 12, 2018

(51) Int. Cl.
*F16H 57/04* (2010.01)
*F16H 57/02* (2012.01)

(52) U.S. Cl.
CPC ......... *F16H 57/0423* (2013.01); *F16H 57/02* (2013.01); *F16H 2057/02043* (2013.01)

(58) Field of Classification Search
CPC ....... F16H 57/0424; F16H 2057/02043; F16H 2057/02047; F16H 57/0421; F16H 57/0452
See application file for complete search history.

(56) References Cited

U.S. PATENT DOCUMENTS

| | | | |
|---|---|---|---|
| 3,590,955 A | * | 7/1971 | Rau ............... F01M 11/065 184/103.2 |
| 4,366,724 A | * | 1/1983 | Yamamori ......... B60K 17/04 475/160 |
| 4,995,971 A | | 2/1991 | Droste et al. |
| 5,472,383 A | | 12/1995 | McKibbin |
| 7,077,776 B2 | | 7/2006 | Sorab et al. |
| 7,276,006 B2 | | 10/2007 | Reed et al. |
| 7,308,970 B2 | | 12/2007 | Holub |
| 7,942,245 B2 | | 5/2011 | Shimizu et al. |
| 8,122,787 B2 | | 2/2012 | Simpson et al. |

FOREIGN PATENT DOCUMENTS

GB    2042650 B    11/1979

* cited by examiner

*Primary Examiner* — Thomas C Diaz
(74) *Attorney, Agent, or Firm* — Brooks Kushman P.C.

(57) ABSTRACT

A transmission includes a torque converter, an output shaft, rotatable gearing components, a case, and a pan secured to the case. The case defines a torque converter housing for receiving the torque converter, an output shaft housing for receiving the output shaft, and a central barrel extending between the torque converter housing and the output shaft housing for receiving the rotatable gearing components. The case further defines a first hole and a second hole through a bottom wall of the central barrel and a tapering channel extending longitudinally along the central barrel from the first hole to the second hole. The pan defines a fluid reservoir disposed below the first and second holes to receive gravity-fed fluid from the tapering channel through the first and second holes.

16 Claims, 4 Drawing Sheets

TRANSMISSION CASE WITH INTEGRATED DRAIN CHANNEL

TECHNICAL FIELD

This disclosure relates to a transmission case, and more particularly, to a transmission case having an integrated drain channel.

BACKGROUND

Automatic transmissions for both two-wheel drive and four-wheel drive vehicles may have a closed-barrel design wherein automatic transmission fluid (e.g., oil) is circulated through a hydraulic control circuit. Oil may be pumped into the upper case for circulation through valve body components, clutches, and lubrication circuits, and returned by means of drainback openings in the bottom of the upper case. Accumulation of oil in the upper case may increase contact between the oil and rotating components of the transmission. This increased contact may increase parasitic losses in the transmission. Furthermore, accumulation of oil in the upper case may exacerbate problems relating to maintaining an adequate reservoir of oil for the oil pump.

SUMMARY

In at least one approach, a transmission is provided. The transmission may include a torque converter, an output shaft, rotatable gearing components, a case, and a pan secured to the case. The case may define a torque converter housing for receiving the torque converter, an output shaft housing for receiving the output shaft, and a central barrel extending between the torque converter housing and the output shaft housing for receiving the rotatable gearing components. The case may further define a first hole and a second hole through a bottom wall of the central barrel and a tapering channel extending longitudinally along the central barrel from the first hole to the second hole. The pan may define a fluid reservoir disposed below the first and second holes to receive gravity-fed fluid from the tapering channel through the first and second holes.

In at least one approach, a transmission assembly is provided. The transmission assembly may include a case and a pan secured to the case. The case may define at least one hole through a bottom wall and a channel formed in and protruding from the bottom wall and extending from the hole. The pan may be secured to the case below the hole and the channel such that at least a portion of the channel extends into a reservoir of the pan and the pan receives gravity-fed fluid from the channel through the hole.

In at least one approach, a transmission case is provided. The transmission case may include a case wall having a bottom wall defining a through-hole disposed vertically below a central axis of the transmission case. The transmission case may further define an elongated channel that extends longitudinally along a length of the bottom wall. The elongated channel may intersect a peripheral edge wall of the through-hole.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
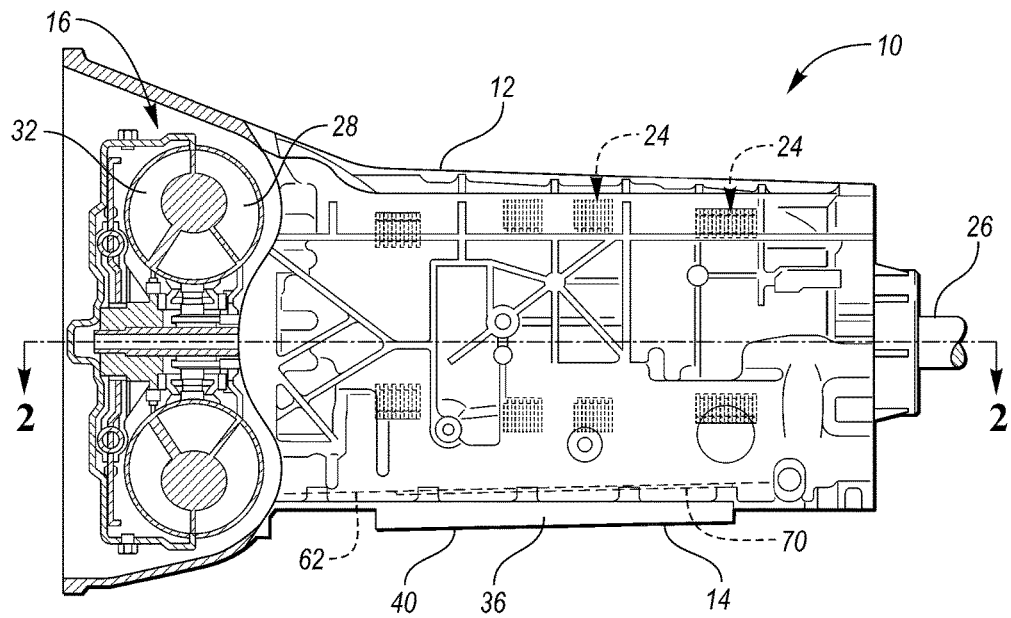
FIG. 1 is a side elevation view, partially in cross section, showing an automatic transmission case and oil pan.
Figure 2:
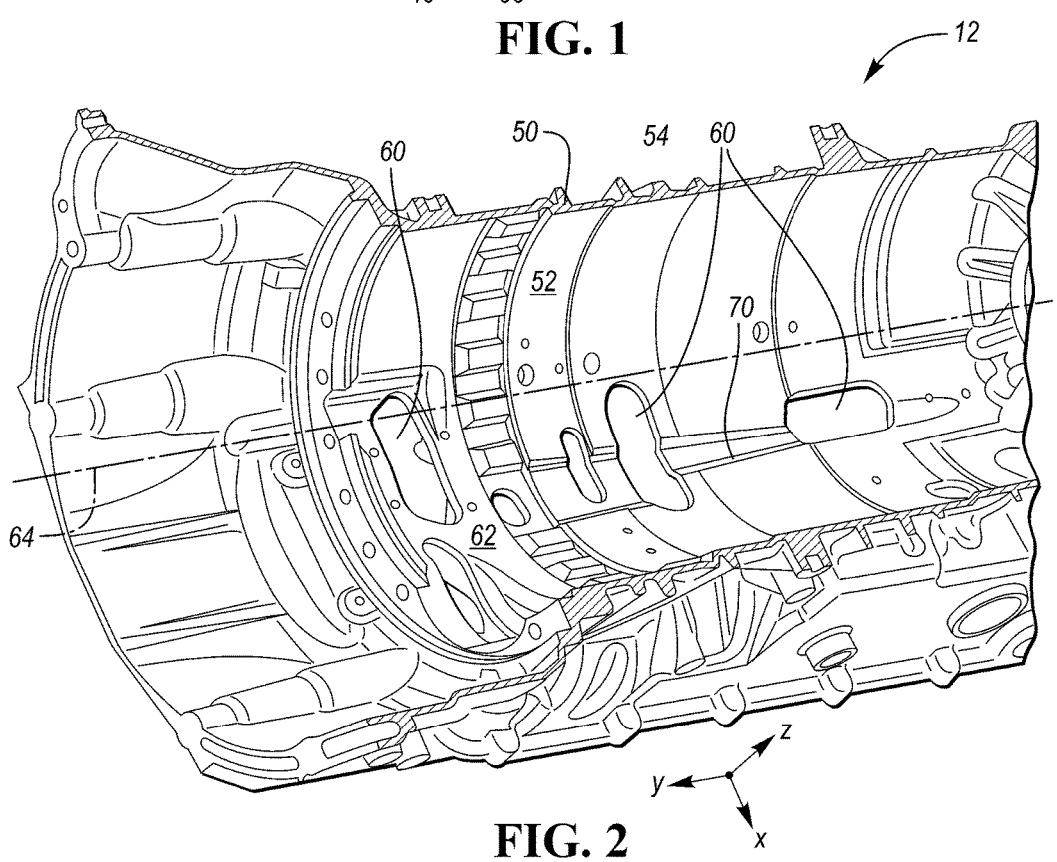
FIG. 2 is a perspective view of a cross section of the automatic transmission case along line 2-2 of FIG. 1.

Referring now to FIG. 1, an automatic transmission assembly 10 may include a case 12. A transmission fluid reservoir or oil pan 14 may be located below and secured to the case 12. Within the case 12 may be disposed transmission components and subsystems including a torque converter 16 (e.g. a hydrokinetic torque converter), gearing 24, and an output shaft 26. Transmission fluid, sometimes referred to as oil, may circulate within the transmission in a hydraulic system under pressure produced by a hydraulic pump. For example, oil may flow from the case to an external oil cooler (which may extract heat from the fluid), and may return from the cooler to the oil pan 14 or other region of the automatic transmission assembly 10. Heat from the transmission fluid may be exchanged in the cooler, for example, by convection to air passing at high speed between fins radiating from the lines that carry the fluid through the cooler and by conduction to surrounding fluid. In this way, fluid may be continuously delivered to the oil pan 14 from the hydraulic system and from the cooler. For example, a positive displacement pump, driven by the engine, may continuously draw fluid from the oil pan 14 to the pump inlet and may deliver fluid at the pump outlet to the hydraulic system. As such, there may be a continuous flow of transmission fluid to and from the oil pan 14.

The torque converter 16 may include a bladed impeller wheel 28 driven by an engine. A bladed turbine 32, arranged in toroidal fluid flow relationship with respect to the impeller 28, may be driven (e.g., hydrokinetically) by the impeller and may be driveably connected to the gearing 24. A bladed stator wheel, mounted on an overrunning brake, makes it possible for hydrokinetic torque multiplication to occur in the converter 16. The torque converter 16 may be supplied with fluid by the hydraulic system located in the transmission case 12.

The oil pan 14 may be secured (e.g., fastened by bolts) to the lower surface of the case 12. The oil pan 14 may provide a reservoir 36 for containing fluid, which may be drawn upward through a passage to the pump inlet. The oil pan 14 may include a lower surface 40, which may form a boundary of the reservoir by enclosing fluid in the oil pan.

Referring now to FIGS. 2-6, the case 12 may be formed of a case wall 50. The case wall 50 may extend around internal transmission components and subsystems (such as gearing 24 of FIG. 1). The case wall 50 may define an internal surface 52 facing the internal transmission components, and an external surface 54 disposed opposite the internal surface 52 and facing an exterior of the transmission.

Figure 3:
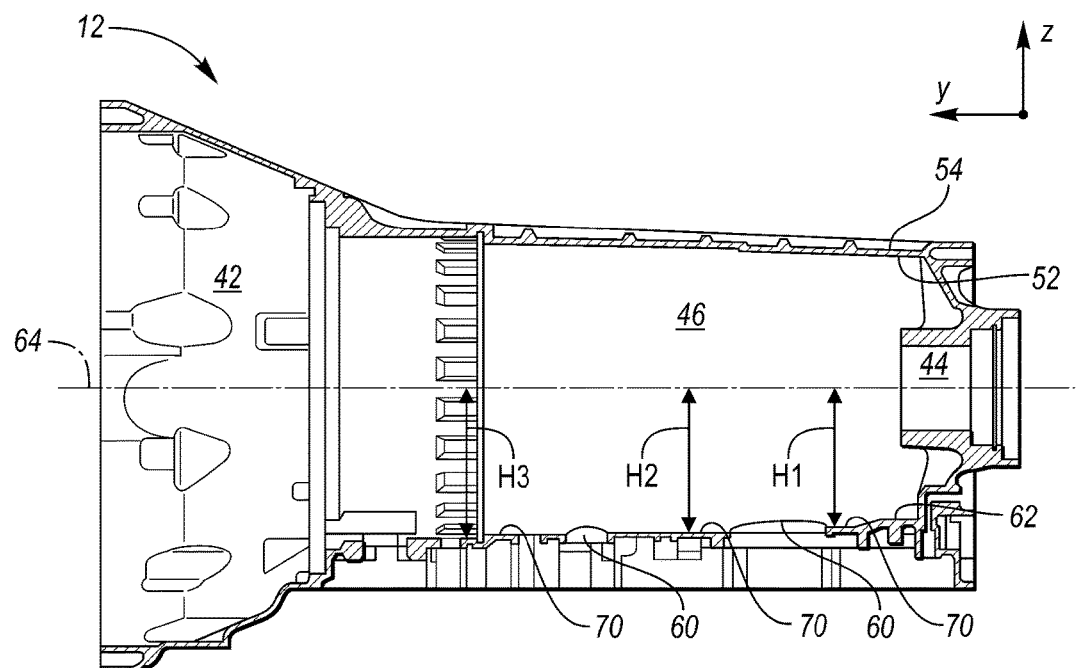
FIG. 3 is a side elevation view of a cross section of the automatic transmission case of FIG. 1.

As shown in FIG. 3, the case 12 may define a torque converter housing 42 for receiving a torque converter 16, and an output shaft housing 44 for receiving an output shaft 26. A central barrel 46 may extend between the torque converter housing 42 and the output shaft housing 44. The central barrel 46 may be sized to receive gearing, such as gearing 24 of FIG. 1.

The case 12 may be provided with one or more drain holes 60 (also referred to as drainback holes) disposed through the case wall 50. The drain holes 60 may extend through an entire thickness of the case wall; for example, from the internal surface 52 to the external surface 54. As such, the drain holes 60 may also be referred to as through-holes.

In at least one approach, the drain holes 60 may be disposed through a bottom wall 62 of the case 12. As used herein, "bottom" may refer to a relative position as acted upon by gravitational forces (e.g., in the Z-direction) when the case 12 is installed in a vehicle. In the installed configuration, the bottom wall 62 may define a lowermost wall of the case 12; for example, as shown in the orientation of FIG. 1. In this way, the drain holes 60 may receive gravity-fed oil (for example, from gearing components 24).

The bottom wall 62 may be a bottom wall region that extends longitudinally along the internal surface (e.g., along the Y axis of FIG. 2), and laterally along an arc extending about a central axis 64 of the case 12 (e.g., central axis parallel to the Y axis). The central axis 64 of the case 12 may correspond to a central axis of the output shaft housing 44. The arc length may generally correspond to a width of the bottom wall region. The arc length may be approximately 180° (i.e., the entire bottom half of the case 12); approximately 135°; approximately 90°; approximately 45°; approximately 30°; approximately 15°; or any suitable arc length.

The drain holes 60 may be located at locations along the bottom wall 62 at which the external surface 54 of the case wall 50 is disposed opposite and facing the reservoir 36 of the oil pan 14. In this way, an internal cavity of the case 12 may be fluidly connected to the reservoir 36 through the drain holes 60. As such, transmission fluid may circulate through the case 12, into the reservoir 36 of the oil pan 14, and subsequently through the hydraulic system to be recirculated back into the case 12.

In some instances, it may be desirable to minimizing the accumulation of transmission fluid that may be engaged with rotating components 24 at the bottom wall 62 of the case 12. The reduction of oil-to-component contact may reduce parasitic loss, which may improve fuel efficiency of the vehicle. The reduction of oil-to-component contact may be accomplished, for example, by increasing fluid flow from the case 12 to the oil pan 14.

In at least one approach, increased fluid flow from the case 12 to the oil pan 14 may be promoted by enlarging one or more drain holes 60. In some instances, however, enlarging drain holes 60 may have an adverse effect on the structural integrity of the case 12. Enlarging drain holes 60 may also have adverse effects relating to molten fluid flow during the die casting of the case 12.

In at least another approach, the case 12 may be provided with a drain channel 70 (also referred to as a drainback channel). The drain channel 70 may be formed at the bottom wall 62 of the case wall 50. In this way, the drain channel 70 may also be referred to as an integrated drain channel.

Figure 7:
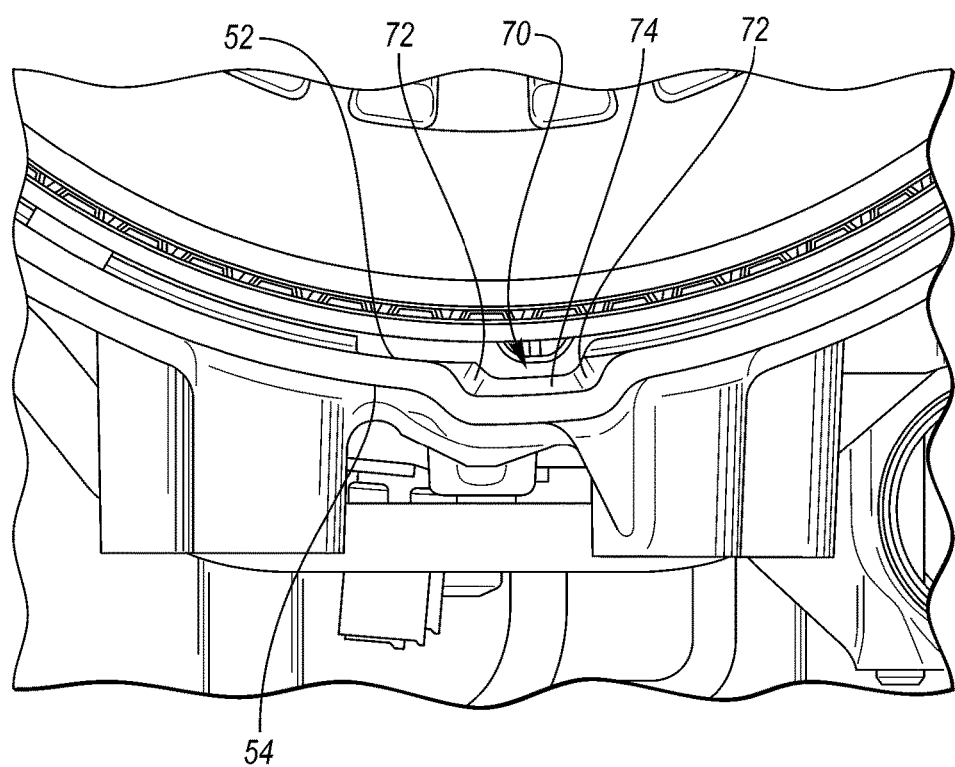
FIG. 7 is a side elevation view of a portion of the automatic transmission case of FIG. 1.

The drain channel 70 may be formed in the bottom wall 62 such that the internal surface 52 is discontinuous at the bottom wall 62. As best shown in FIG. 7, the drain channel 70 may also be formed in the bottom wall 62 such that the external surface 54 is discontinuous at the bottom wall 62. In this approach, the case wall 12 may have a constant (or substantially constant) thickness along the bottom wall 62. In still another approach, the drain channel 70 may be formed in the bottom wall 62 such that the external surface 54 is continuous at the bottom wall 62. In this approach, the case wall 12 may have a variable thickness along the bottom wall 62.

The drain channel 70 may define an internal channel surface 72 and opposing channel walls 74. The channel walls 74 may extend in a direction away from the central axis of the case 12 to define a depth of the drain channel 70. In this way, the internal channel surface 72 may be spaced a radial distance from the central axis 64 of the case 12 that is greater than a radial distance of the internal surface 52.

The drain channel 70 may extending longitudinally (e.g., parallel to the central axis 64) along the bottom wall 62 such that it intersects peripheral edge walls of the holes 60. For example, one channel wall 74 of the drain channel 70 may intersect a peripheral edge wall of a hole 60, and the opposing channel 74 may not intersect a peripheral edge wall of the hole 60. In this example, a portion of the hole is disposed within the drain channel 70 and a portion of the hole 60 extends through a channel wall 74 of the drain channel 70. In another example, both opposing channel walls 74 of the drain channel 70 may intersect a peripheral edge wall of a hole 60. In this example, the hole 60 extends through both opposing channel walls 74. In still another example, neither opposing channel wall 74 of the drain channel 70 may intersect a peripheral edge wall of a hole 60. In this example, the hole 60 may be disposed entirely within the drain channel 70.

In at least one approach, the drain channel 70 may extend from a first hole 60 to a second hole 60. The drain channel 70 may also extend such that it intersects at least three holes 60 disposed through the bottom wall 62.

In at least one approach, the drain channel 70 is a tapered drain channel. For example, the drain channel 70 may taper from a first width at a first axial end to a second width at a second axial end opposite the first axial end. As such, the drain channel 70 may have a tapered width along a longitudinal axis of the transmission case 12.

Figure 4:
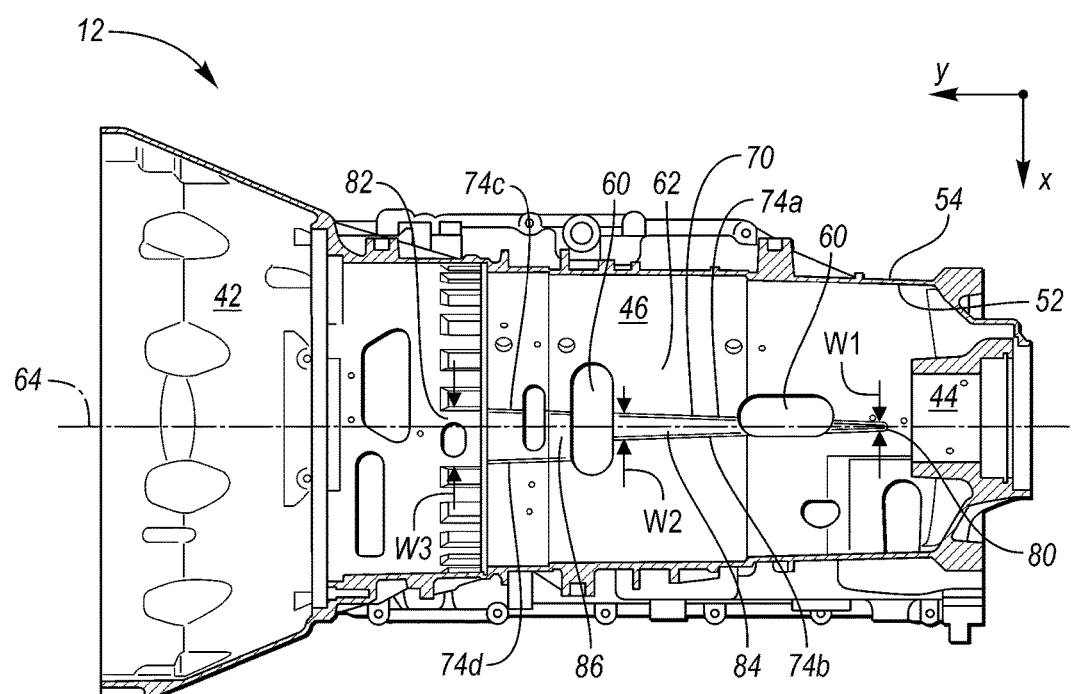
FIG. 4 is a top plan view of the cross section of FIG. 2.

More particularly, as shown in FIG. 4, the drain channel 70 may taper from a first width W1 at a first axial end 80 of the drain channel 70 to a second width W2 at a central region of the drain channel, and to a third width W3 at a second axial end 82 of the drain channel 70. The first width W1 may be less than the second width W2, which may be less than the third width W3.

In at least one approach, the drain channel 70 may define discrete taper regions defined by tapered channel walls 74. For example, as shown in FIG. 4, the drain channel 70 may define a first taper region 84 (which may, for example, extend from width W1 to a peripheral edge of a drain hole 60 at approximately width W2). The first taper region 84 may be defined by a first set of opposing tapered channel walls 74a, 74b. The drain channel 70 may define a second taper region 86 at an opposite peripheral edge of a drain hole 60 (e.g., the same drain hole 60). The second taper region 86 may be defined by a second set of opposing tapered channel walls 74c, 74d. In at least one approach, one tapered channel wall 74c of the second set may be disposed in alignment with a corresponding tapered wall 74a of the first set. An opposing tapered channel wall 74d of the second set may be disposed in offset alignment with a corresponding tapered wall 74b of the first set. That is, a tapered wall 74c of the second tapered region 86 may extend parallel to and in alignment with a tapered wall 74a of the first tapered region 84, and an opposing tapered wall 74d of the second tapered region 86 may extend parallel to and offset from an opposing tapered wall 74b of the first tapered region 84.

Figure 5:
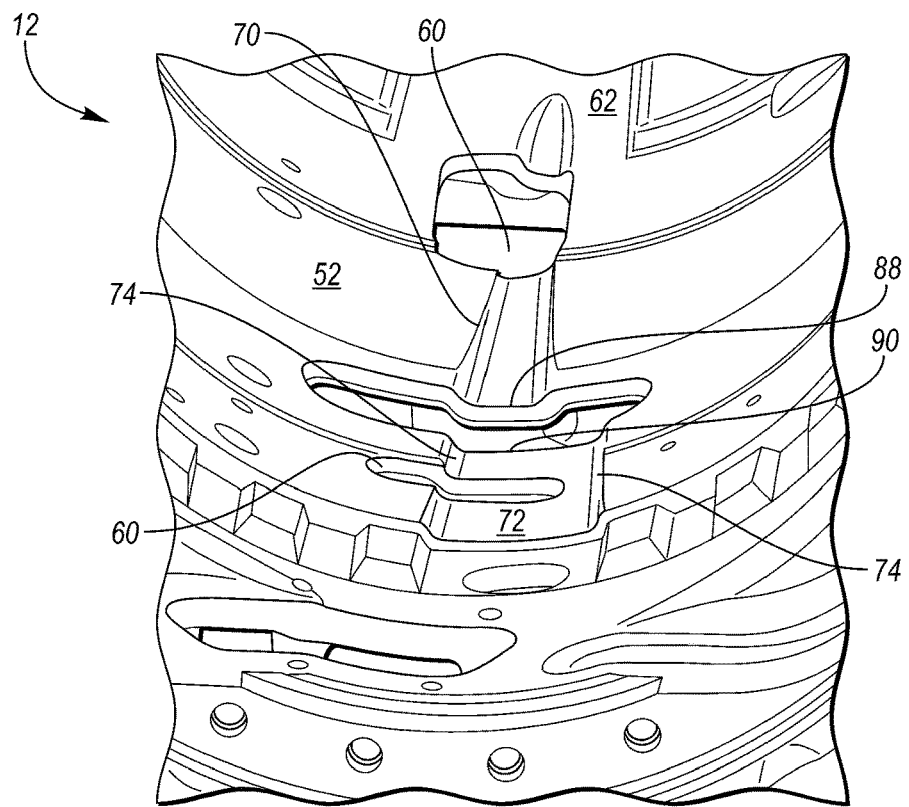
FIG. 5 is a perspective view of a portion of an interior of the automatic transmission case of FIG. 1.
Figure 6:
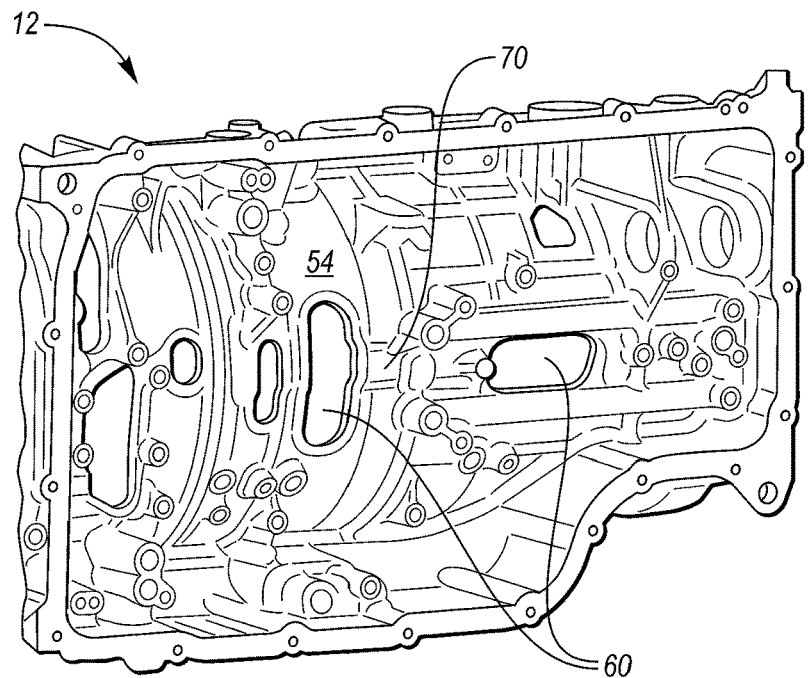
FIG. 6 is a bottom perspective view the automatic transmission case of FIG. 1.

Referring to FIG. 5, a peripheral edge of hole 60 may defines a generally U-shaped wall 88 at a first intersection of the drain channel 70 and the peripheral edge. As used herein, a "generally" U-shaped wall may be a wall having a valley floor that may be generally planar or slightly rounded, and opposing valley walls extending from the valley floor. The valley walls may extend orthogonal to, or at an obtuse angle relative to the valley floor. An opposing peripheral edge of the drain hole 70 may define an opposing generally U-shaped wall 90 at a second intersection of the drain channel 70 and the opposing peripheral edge. The generally U-shaped wall 88 may define a valley at the first intersection having a width less than a valley of the generally opposing U-shaped wall 90 at the second intersection.

As shown in FIG. 3, the bottom wall 62 may be a sloped bottom wall. As the drain channel 70 extends axially along the sloped bottom wall 62, the drain channel 70 may be a sloped drain channel. In this way, a first end of the drain channel 70 may be spaced a first distance or height H1 from the central axis 64 of the transmission case 12, an intermediate portion of the drain channel 70 may be spaced a second distance or height H2 from the central axis 64, a second end of the drain channel 70 opposite the first end may be spaced a third distance or height H3 from the central axis 64. Heights H1, H2, H3 may be different, and may successively increase or decrease along the axial length ofthe drain channel 70. More particularly, the third height H3 may be greater than the second height H2, which may be greater than the first height H1.

In one approach, the oil pan 14 may be secured to the case 12 such that the oil pan 14 encompasses an entire longitudinal length and lateral width of the drain channel 70. As shown in FIG. 1, at least a portion of the drain channel 70 may extend into the reservoir 36 of the oil pan 14. As the drain channel 70 may be disposed below the rotatable gearing components (components 24), the drain channel 70 may receive gravity-fed fluid from the rotatable gearing components. Furthermore, as the drain channel 70 may be disposed between the rotatable gearing components and the oil pan 14, the gravity-fed fluid received in the drain channel 70 may then be communicated to the oil pan 14. As previously discussed, the gravity-fed fluid may then be cooled and recirculated through the automatic transmission assembly 10.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A transmission case comprising:
a transmission case wall having a bottom wall defining a through-hole disposed vertically below a central axis of the transmission case, and further defining an elongated channel extending longitudinally along a length of the bottom wall, wherein the elongated channel intersects a peripheral edge wall of the through-hole, and wherein the elongated channel has a tapered width along a longitudinal axis of the transmission case.

2. The transmission case of claim 1 wherein the transmission case wall defines a torque converter housing and an output shaft housing, wherein the elongated channel extends longitudinally between the torque converter housing and the output shaft housing, and wherein the elongated channel tapers from a first width proximate the torque converter housing to a second width different than the first width proximate the output shaft housing.

3. The transmission of claim 2 wherein the first width proximate the torque converter housing is greater than the second width proximate the output shaft housing.

4. The transmission case of claim 1 wherein the elongated channel defines a first tapered region extending to a peripheral edge of the through-hole, and a second tapered region extending from an opposing peripheral edge of the through-hole.

5. The transmission case of claim 4 wherein a tapered wall of the second tapered region extends parallel to and in alignment with a tapered wall of the first tapered region, and wherein an opposing tapered wall of the second tapered region extends parallel to and offset from an opposing tapered wall of the first tapered region.

6. The transmission case of claim 1 wherein a floor surface of the elongated channel at a first end of the elongated channel is spaced a first distance from a central axis of the transmission case, and wherein the floor surface at a second end opposite the first end is spaced a second distance from the central axis greater than the first distance.

7. The transmission case of claim 1 wherein the through-hole is disposed entirely within the elongated channel.

8. A transmission case comprising:
a transmission case wall having a bottom wall defining a through-hole disposed vertically below a central axis of the transmission case, and further defining an elongated channel extending longitudinally along a length of the bottom wall, wherein the elongated channel intersects a peripheral edge wall of the through-hole, wherein the through-hole extends through opposing sidewalls of the elongated channel.

9. A transmission case comprising:
a transmission case wall having a bottom wall defining a through-hole disposed vertically below a central axis of the transmission case and an elongated channel extending longitudinally along a length of the bottom wall, the elongated channel intersecting a peripheral edge wall of the through-hole, wherein a portion of the through-hole is disposed within the elongated channel and wherein a portion of the through-hole extends through a sidewall of the channel.

10. The transmission case of claim 1 wherein the bottom wall defines a first through-hole and a second through-hole longitudinally spaced from the first through-hole along a central axis of the transmission case, and wherein the elongated channel extends from the first through-hole to the second through-hole.

11. The transmission case of claim 1 wherein the elongated channel intersects at least three through-holes disposed through the bottom wall.

12. The transmission case of claim 1 wherein a peripheral edge of the through-hole defines a generally U-shaped wall at a first intersection of the elongated channel and the peripheral edge.

13. The transmission case of claim 12 wherein an opposing peripheral edge of the through-hole defines an opposing generally U-shaped wall at a second intersection of the elongated channel and the opposing peripheral edge.

14. The transmission case of claim 13 wherein the generally U-shaped wall defines a valley at the first intersection having a width less than a valley of the generally opposing U-shaped wall at the second intersection.

15. The transmission case of claim 1 further comprising:
a pan secured to the bottom wall below the through-hole and the elongated channel such that at least a portion of the elongated channel extends into a reservoir of the pan and the pan receives gravity-fed fluid from the elongated channel through the through-hole.

16. The transmission case of claim 15 wherein the pan is secured to the bottom wall such that the pan encompasses an entire longitudinal length and lateral width of the elongated channel.

* * * * *